United States Patent [19]

Fergg et al.

[11] 4,315,686
[45] Feb. 16, 1982

[54] EXPOSURE CONTROLS FOR PHOTOGRAPHIC COPY MACHINES

[75] Inventors: Berthold Fergg, Taufkirchem; Wilhelm Nitsch, München; Mathias Pflugbeil, Baldham, all of Fed. Rep. of Germany

[73] Assignee: AGFA-Gevaert Aktiengesellschaft, Leverkusen, Fed. Rep. of Germany

[21] Appl. No.: 132,811

[22] Filed: Mar. 24, 1980

[30] Foreign Application Priority Data

Mar. 23, 1979 [DE] Fed. Rep. of Germany ....... 2911523

[51] Int. Cl.³ .............................................. G03B 27/80
[52] U.S. Cl. ...................................................... 355/38
[58] Field of Search ................................... 355/35, 38

[56] References Cited

U.S. PATENT DOCUMENTS

| | | | |
|---|---|---|---|
| 3,293,033 | 12/1966 | Maddock et al. | 355/38 X |
| 3,672,768 | 6/1972 | Schaub et al. | 355/38 |
| 3,867,029 | 2/1975 | Weinert | 355/38 |
| 3,873,199 | 3/1975 | Weinert | 355/38 |
| 4,191,466 | 3/1980 | Gandini | 355/35 |
| 4,192,605 | 3/1980 | Fergg et al. | 355/38 |
| 4,222,661 | 9/1980 | Wahli et al. | 355/35 |

Primary Examiner—Richard A. Wintercorn
Attorney, Agent, or Firm—Peter K. Kontler

[57] ABSTRACT

A photographic copying machine wherein copying light which issues from a light source and is directed toward an original is caused to pass through a light intensity weakening shutter of the venetian blind type. The shutter is adjusted to change the rate of passage of light therethrough in dependency on the intensity of signals which are generated by the exposure control system of the copying machine and denote the anticipated exposure times in the red, green and blue colors. If the anticipated exposure times are too short, the intensity of copying light which impinges upon the copying material is reduced by a stepwise adjustment of the venetian blind type shutter. Inversely, the shutter is caused to permit the passage of more light if the signals which are generated by the exposure control system denote a relatively long exposure times in the three colors. The switch-over from the higher intensity to the lower intensity takes place at lower density of the original than that corresponding to the switch-over in the opposite direction. An additional shutter is opened only with a delay corresponding to at least one-half the time period needed for adjustment of the venetian-blind shutter, in the event that such adjustment takes place.

6 Claims, 4 Drawing Figures

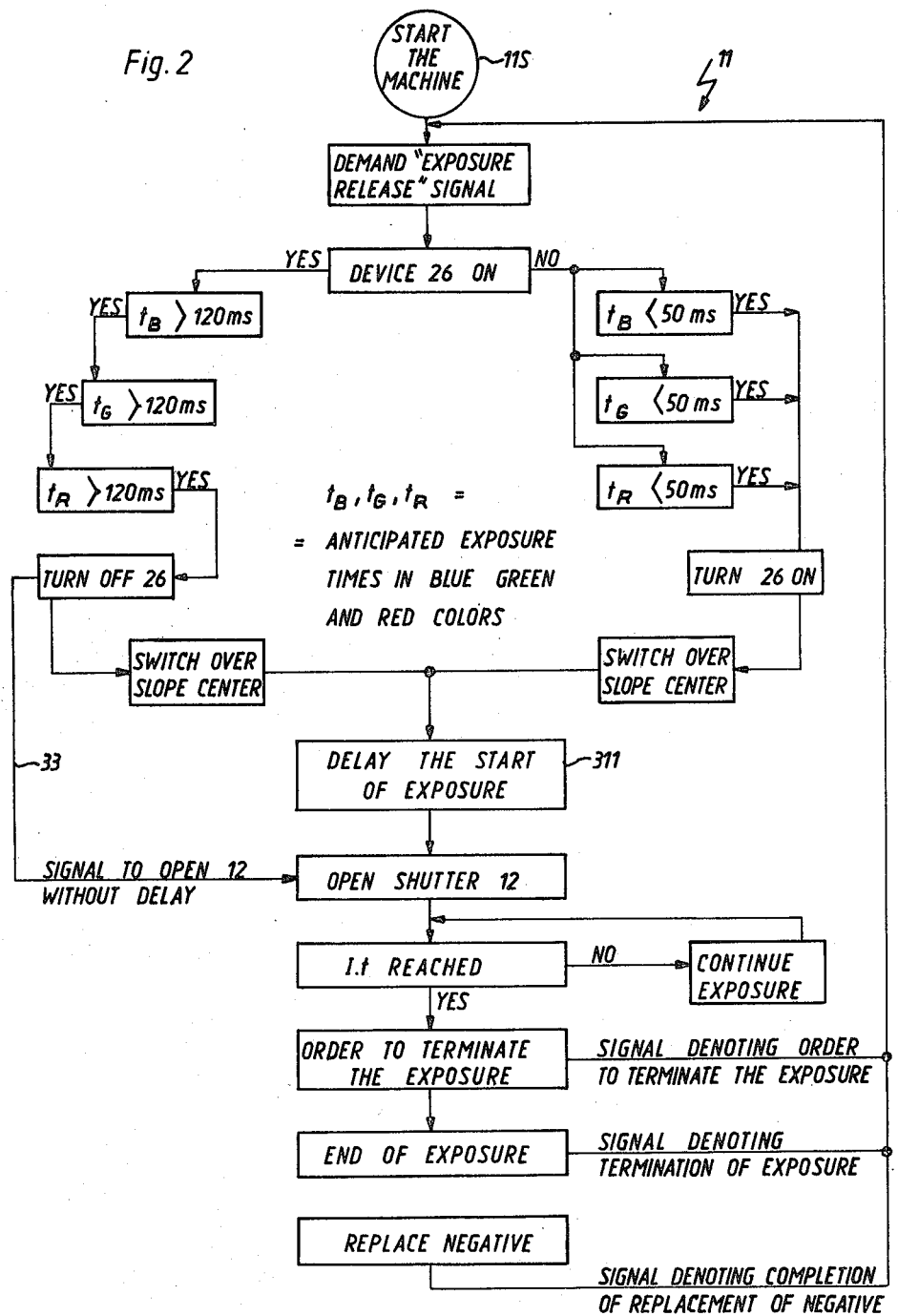

EXPOSURE CONTROLS FOR PHOTOGRAPHIC COPY MACHINES

BACKGROUND OF THE INVENTION

The present invention relates to photographic copying machines in general, and more particularly to improvements in means for regulating the intensity of copying light in photographic copying machines. Still more particularly, the invention relates to improvements in means for regulating the intensity of copying light in photoelectrically controlled copying machines with automatic regulation of exposure time, wherein a light intensity controlling arrangement is provided which controls the intensity of light which travels from a light source to a copying material.

Commonly owned German Pat. No. 1,162,192 discloses a photographic copying machine wherein an adjustable diaphragm is installed in the path of copying light. The diaphragm is adjusted in dependency on light transmissivity of the original to be copied in such a way that the intensity of copying light in the copying plane is maintained at a predetermined value. Such analog follow-up control systems are quite complex and expensive. In addition, the relatively high expenditures for such regulation are unnecessary because the quantity of copying light is regulated in any event as a function of time.

OBJECTS AND SUMMARY OF THE INVENTION

An object of the invention is to provide a photographic copying machine with novel and improved exposure control means.

Another object of the invention is to provide the exposure control means with a novel and improved device for regulating the intensity of light in the copying plane.

A further object of the invention is to improve an automatic device which regulates the intensity of light in the copying plane as a function of several parameters which influence the quality of reproductions of color photographic negatives.

An additional object of the invention is to provide the copying machine with novel and improved means for reducing the intervals of time which elapse between the making of successive exposures.

A further object of the invention is to provide the copying machine with improved means for controlling the operation of means for varying the intensity of light which impinges upon a color photographic negative during exposure of such negative to copying light.

An additional object of the invention is to provide a copying machine which ensures that the exposure times are shorter than in conventional machines.

In pursuance of these objects and others which will become apparent hereafter, one feature of the present invention resides, in a machine for making photographic copies of color originals on a photosensitive copying material, wherein the original is supported in a predetermined plane extending across the path of light from a light source to the copying material, wherein the duration of exposure of the copying material to copying light in several colors is selected by an automatic exposure control system, wherein a light intensity weakening device controls the intensity of light travelling in the aforementioned path, and wherein an adjusting device adjusts the light intensity weakening device in dependency on the density of the original, in the combination of normally closed shutter means interposed between said plane and the copying material; means for opening said shutter means for the duration of exposure as determined by the automatic exposure control system; and means for delaying the operation of said opening means for a predetermined interval of time (preferably amounting to at least 50 percent of the period of time which is required for the adjustment of the light intensity weakening means) whenever the weakening device is being adjusted by the adjusting means. The adjusting means may include means for actuating the delaying means, i.e., the making of an exposure is or can be delayed in automatic response to adjustment of the light invensity weakening means so that the latter permits a larger or smaller quantity of copying light to reach the customary complementary color filters of the exposure control system, namely, the filters which control the exposure times in different colors.

An important advantage of constructing the copying device in this manner is that the change in the intensity of light, which is caused by the adjustment of the position of the weakening device, is affective for a predominant part of the period of exposure, when the weakening device has been adjusted by at least one-half of its adjustment range toward its desired position, particularly in view of the fact that the relatively short periods of exposure do not required exceed those consumed for adjustment of the weakening device.

Preferably, especially when the invention is employed in a machine in which control signals generated by the exposure control system and denoting the desired intervals of exposure of the copying material in each of three different colors are compared with first and second reference signals respectively denoting the longest and shortest acceptable intervals of exposure to light in any of such colors, and in which the light intensity of weakening device is permanently located in the aforementioned path and is moveable by the adjusting means to a first position of high transmissivity when the value of at least one of the control signals transcends that of the first reference signal and to a second position of low transmissivity when the value of at least one of the control signals transcends that of the second reference signal, the present invention purposes to so select the value of the first reference signal as to exceed (advantageously by approximately 20 percent) that of the product of multiplication of the second reference signal by a constant denoting the light intensity weakening effect of the weakening device in its second position relative to its first position.

When this expedient is resorted to, it is achieved that the light intensity weakening device is adjusted to its position of lower transmissivity at a lower density of the original than would otherwise be the case, which reduces the number of occasions at which the light intensity weakening device will have to be adjusted to one or the other of its positions before the commencement of the exposure. This is particularly useful when making copies of a series of originals which have approximately the same density approximating the density at which the adjusting device adjusts the position of the light intensity weakening device. In the absence of this feature, it could happen, under the most disadvantageous circumstances, that the adjusting device would adjust the light intensity weakening device for each of the originals of the series. Such frequent switching operation would cause, in connection with the periods of delay of the operation of the opening means for the shutter means, a significant reduction in the throughout of the copying machine.

The novel features which are considered as characteristic of the invention are set forth in particular in the appended claims. The improved copying machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a flow sheet showing the manner of regulating the light intensity weakening means in the machine of FIG. 1.

DESCRIPTION OF THE PREFERRED EMBODIMENTS

Figure 1:
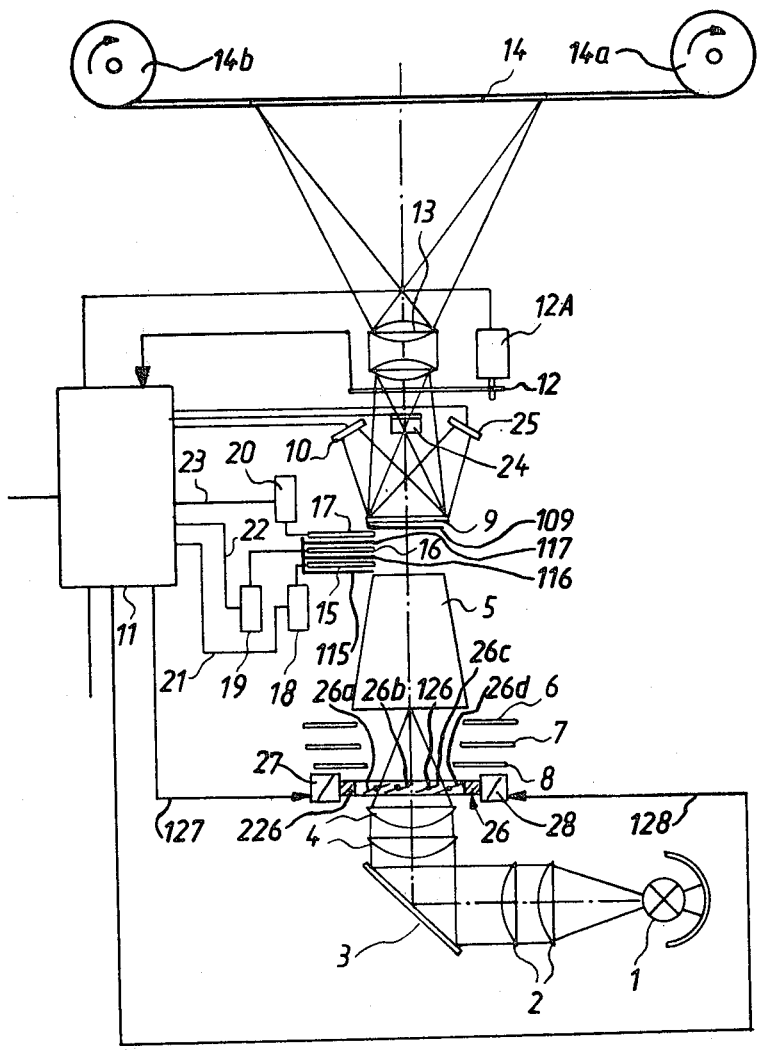
FIG. 1 is a schematic elevational view of a copying machine which embodies the invention.
Figure 1A:
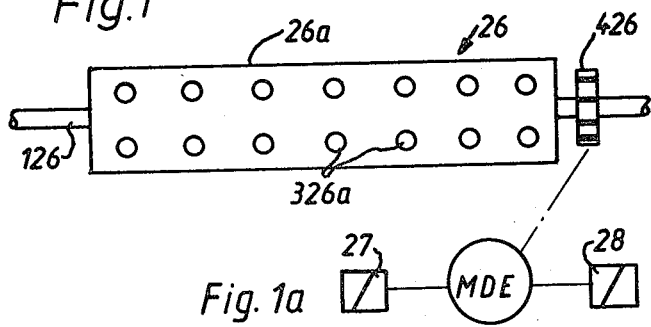
FIG. 1a is an enlarged plan view of certain components of the light intensity weakening means in the copying machine of FIG. 1.

The photographic copying machine of FIG. 1 comprises a source 1 of light which emits radiation in all necessary wavelength ranges. The rays issuing from the source 1 pass through a double condenser lens 2 and are reflected by a cold light mirror 3 which causes the reflected light to pass through additional condenser lenses 4 and to enter a light mixing duct or shaft 5. The duct 5 is located behind a light intensity weakening device 26 which, in certain respects, resembles a venetian blind type shutter. The slats 26a, 26b, 26c, 26d of the device 26 are pivotable about the axes of shafts 126 which extend at right angles to the plane of FIG. 1 and are installed in the frame 226 of the device 26. The design of the light intensity weakening device 26 is such that it allows a certain amount of light to pass toward the duct 5 even when the slats 26a-26d are moved to their closed positions, i.e., to the positions in which each thereof intercepts a maximum amount of light. This can be achieved in a number of ways, for example, by making the slats only so wide that they cannot fully overlap each other in their closed positions, i.e., that they define clearances or gaps through which a requisite amount of light can enter the duct 5. Alternatively, the slats 26a-26b can fully overlap each other in the closed or operative position of the device 26; however, they are provided with openings (e.g., rows of circular apertures 326 shown in FIG. 1a) which allow a certain minimal amount of light to pass into the mixing duct 5 when the device 26 is caused to assume its closed position in which it intercepts the maximum amount of light coming from the condenser lenses 4.

The shafts 126 for the slats 26a-26d carry gears or eccentrics 426 (one shown in FIG. 1a) which are disposed within the frame 226 and receive motion from a reversible main driving element MDE actuatable by a first adjusting electromagnet 27 or by a second adjusting electromagnet 28. The first electromagnet 27 is energizable to open the device 26, and the second electromagnet 28 is energizable to close the device 26. The electromagnets 27 and 28 do not have or do not cooperate with return springs or like biasing means so that the light intensity weakening device 26 remains in the position it has assumed upon deenergization of the adjusting electromagnet 27 or 28. The speed at which the electromagnet 27 can move the slats 26a-26d from the fully closed to the fully open positions is identical with the speed at which the electromagnet 28 can move the slats from the fully open to the fully closed positions.

The device 26 is followed by a set of complementary color filters 6, 7 and 8 which can be inserted into the path of light entering the inlet of the mixing duct 5. The extent to which one or more filters will be moved into the path of copying light depends on sensitivity of the copying material 14. Thus, the filter 6, 7 and/or 8 will be used to impart to the light entering the duct 5 a certain color shade. The duct 5 insures uniform mixing of incoming light so that the light which reaches the original 9 is of uniform brightness and color distribution. The light which passes through the original 9 impinges upon photosensitive detectors which are rendered selectively sensitive by color filters (not specifically shown). In the illustrated embodiment, the detectors include silicon photoreceivers 10, 24 and 25 which are located outside of the path of the beam of copying light but in the range of stray light passing through the original 9. The outputs of the transducers of photoreceivers 10, 24 and 25 are connected to the corresponding inputs of an exposure control circuit 11. The light which passes through the original 9 impinges upon an electromagnetically actuatable shutter 12 which normally intercepts copying light. When the normally closed shutter 12 is opened in response to energization of a rotary electromagnet 12A, copying light can impinge upon an imaging objective 13 which images the original upon a photosensitive receiver 14, e.g., a portion of a roll of photographic paper or analogous copying material which is stored on a supply reel 14a and is collected by a takeup reel 14b. The means for automatically transporting the web of receiver material 14 from the supply reel 14a to the takeup reel 14b upon completion of each exposure is not shown in the drawing. The characteristics of photographic material, i.e., of the web 14, influence the setting of the exposure control circuit 11, i.e., such characteristics play an important role in adjustment of the copying machine in order to make acceptable prints of successive originals 9 or several acceptable prints of one and the same original. Reference may be had to commonly owned U.S. Pat. No. 3,873,199 granted Mar. 25, 1975 to Weinert. The disclosure of the Weinert patent is incorporated herein by reference.

The copying machine further comprises guide means 115, 116, 117 for color filters 15, 16 and 17 which are disposed between the outlet of the mixing duct 5 and the support 109 for the original 9. The colors of the filters 15-17 are complementary, and these filters can be moved into the path of copying light by electromagnets 18, 19 and 20 which are connected to the corresponding outputs of the control circuit 11 by conductor means 21, 22, 23, respectively. By introducing the filter 15, 16 or 17 into the path of copying light, the machine terminates the exposure of the original 9 to light in the respective color. The conductor means which connect the adjusting electromagnets 27, 28 for the slats 26a-26d of the light intensity weakening device 26 to the corresponding outputs of the exposure control circuit 11 are respectively shown at 127 and 128.

Those components of the exposure control circuit 11 which regulate the operation of the light intensity weakening device 26 via conductor means 127, 128 and the corresponding adjusting electromagnets 27, 28 are shown in FIG. 2. The arrangement which is shown in FIG. 2 is assembled as follows:

Upon starting of the copying machine (at 11S), a signal is transmitted to denote the demand for clearance to make an exposure. Such clearance is received only if several requirements are satisfied including whether or not the light intensity weakening device 26 is properly adjusted for imaging of the negative 9 onto the web 14 of photosensitive material. It is necessary to ascertain whether or not the device 26 is on (i.e., whether it intercepts light). Depending upon the condition of the device 26, only the left-hand or only the right-hand branch of the evaluating logic system of FIG. 2 is set in operation. If the device 26 is on, a switchover can take place only if the exposure time for each of the three exposures (in three different colors) is longer than the shortest possible exposure time multiplied by the light weakening factor (e.g., 2) of the device 26. The anticipated exposure time in the individual color channels is determined on the basis of brightness values which are denoted by (first) signals transmitted by the transducers of the photoreceivers 10, 24 and 25 as well as on the basis of sensitivity values which are stored in the exposure control circuit 11 for the selected copying material 14 and the various constants which are characteristic of the copying machine. Such constants can include the type of objective 13, the positions of photoreceivers 10, 24, 25 and/or others. Furthermore, the exposure control circuit 11 takes into consideration one or more correction values which are furnished manually or as a result of automatic scanning of the original. When the determination of anticipated exposure times in the red, blue and green colors indicates that each such exposure time is considerably longer than the comparison time, i.e., that the intensity of each first signal exceeds the intensity of a reference signal denoting the shortest acceptable exposure time, the control circuit 11 transmits the signal to deactivate the light intensity weakening device 26 and to conform the exposure control circuit 11 to the more pronounced brightness of copying light by switching over the slope center. Reference may be had to the aforementioned commonly owned U.S. Pat. No. 3,873,199 to Weinert. When the device 26 is off at the start of an exposure, the minimum permissible exposure time is compared with each of the three anticipated exposure times in the blue, green and red colors. Each such anticipated exposure time is calculated on the premise that it is not influenced by the device 26. It is assumed that the minimum permissible exposure time is 50 milliseconds. If this value exceeds one of the exposure times in the three colors, the control circuit 11 transmits a signal activate the device 26 and to switch over the slope center. The two series of signals then merge in the flow chart and the next signal is an order to delay the start of the exposure. When the minimum exposure time which is determined primarily by inertia of the filters 15, 16, 17 and their drive means does not exceed, at least by one order, the interval which is needed to change the condition of the device 26, it is invariably necessary to complete, at least in part, the movement of slats 26a–26d to thus avoid that the exposure time is reduced below the permissible lower limit in spite of activation of the device 26. Such impulse, which is transmitted via a time delaying means 311 of the control circuit 11 to delay the start signal for the electromagnet 12A which can move the normally closed shutter 12 to open position, can be generated solely as a result of an appropriate delay in time, e.g., by ascertaining the interval which is needed to actuate the device 26 and by making the delay correspond to at least 50 percent of such interval. Alternatively, one can resort to a photocell or an inductive sensor which monitors the movements of the slats 26a–26d and transmits a signal when the slats have completed approximately 50 percent of their movement. When the shutter 12 opens, the control circuit 11 continuously monitors the amount of copying light and compares the monitored quantity with the required quantity. In the event that the quantity of copying light is insufficient, the exposure proceeds. If the quantity of copying light is sufficient, the exposure is completed and, at the same time, the control circuit 11 transmits the first impulse for initiating the start of the next-following exposure. Such next-following exposure can begin in response to transmission of the just mentioned release signal after elapse of the delay as well as in response to transmission of signals which denote (in a manner known per se) that the transport of photographic material 14 has been completed and that the original 9 has been replaced with the next original.

Figure 3:
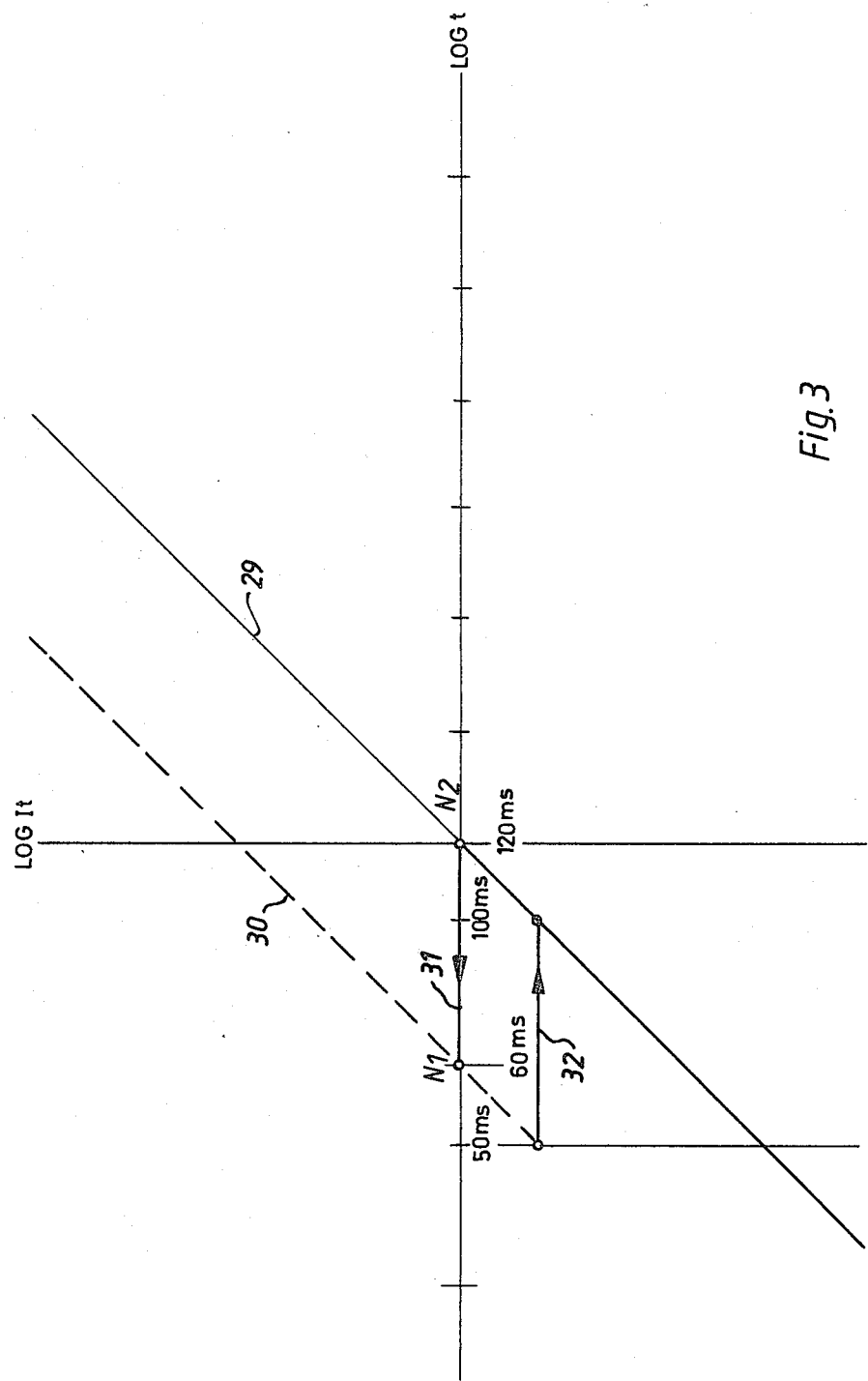
FIG. 3 is a diagram with curves showing the effect of the improved light intensity weakening means.

The mode of operation of the light intensity weakening device 26 can be ascertained by referring to the diagram of FIG. 3. In the illustrated embodiment, the device 26 is assumed to reduce the maximum flow of light by 50 percent. In the diagram of FIG. 3, the logarithm of the amount of copying light is measured along the ordinate and the logarithm of exposure time is measured along the abscissa. The curves denoting various different intensities of copying light are straight lines which are inclined with respect to the abscissa and ordinate. The working curve 29 which passes through the zero point of the coordinate system denotes the progress of exposure times in the case of reduced copying light. The working curve 30 which is indicated by broken lines and is disposed to the left of the curve 29 denotes the full (not weakened) light flow. In the illustrated example, the ordinate denotes the exposure time of 50, 60, 100 and 120 milliseconds. The straight lines 31 and 32 which are parallel to the abscissa denote the paths during switching over of the device 26.

The operation is as follows:

Prior to the making of an exposure, the shutter 12 is closed and the original (negative) 9 to be copied is placed onto or into the support 109, i.e., it is located in a predetermined plane in the path of copying light which issues from the mixing duct 5. The light intensity weakening device 26 can be open or closed, depending on the density of the previously copied original. The source 1 emits light and the detectors 10, 24 and 25 transmit signals denoting the brightness of light in the respective colors in dependency on the color density of the original 9 and also in dependency on the condition (on or off) of the device 26. If the device 26, is on, namely, if it intercepts light, the color density values which are denoted by the signals transmitted by the detectors 10, 24 and 25 are converted into signals denoting exposure times and, in accordance with the left-hand branch of the flow sheet shown in FIG. 2, such signals are compared with a reference value of 120 milliseconds. The comparison serves to ascertain whether or not the exposure times which are obtained in response to signals from the detectors 10, 24 and 25 are longer than the reference value of 120 ms. If this is the case for each of the signals from 10, 24 and 25, the electromagnet 27 receives a corresponding signal via conductor means 127 to deactivate the device 26 and, after elapse of the predetermined delay, the electromagnet 12A is energized to open the shutter 12. However, if at least one of the signals from the detectors 10, 24, 25 is indicative of an exposure time which is less than 120 ms, the device 26 remains on and the electromagnet 12A for the shutter 12 receives a shutter-opening signal without delay (see the conductor means 33 of FIG. 2).

If the device 26 is off at the start of an exposure, i.e., if the original 9 is exposed to all of the light which is emitted by the source 1, the working point is advanced along the broken-line curve 30 of FIG. 3. In such instances, the right-hand branch of the flow sheet of FIG. 2 will determine whether or not the device 26 must be turned on. Again, brightness signals which are transmitted by the detectors 10, 24 and 25 (while the original 9 is exposed to the entire flow of light issuing from the source 1) are converted into first signals denoting anticipated exposure times, and such signals are compared with a reference signal whose intensity denotes the minimum permissible exposure time of 50 ms. If the intensity of signal denoting the anticipated exposure time in at least one color is indicative of an exposure time which is shorter than 50 ms, the device 26 receives a signal to move the slats 26a–26d into the path of copying light and the exposure control circuit 11 transmits an appropriate signal to delay the start of the exposure. If the minimum value of 50 ms is exceeded by each of the anticipated exposure times, the device 26 remains off, i.e., the original is copied while it is exposed to the maximum amount of copying light to thus ensure that one can achieve the desired shortening of the exposure time.

The flow sheet of FIG. 2 indicates that, when switching over to higher light current, one does not compare with the minimum exposure time of 50 ms and with the exposure time of 100 ms (i.e., the minimum exposure time multiplied by the light amplifying factor 2) but rather with an arbitrarily selected exposure time of approximately 120 ms, i.e., the amplified theoretical exposure time plus 20 percent. The reason for this is as follows:

The switching over of the light-weakening device 26 requires a certain interval of time which entails a lengthening of the entire copying interval as a result of the generation of a signal which delays the opening of the shutter 12 via electromagnet 12A. The negatives of a film normally consist of a series of groups of frames, and the frames of each group were exposed under identical circumstances. In other words, when an amateur photographer decides to take a picture, he or she normally makes two or more exposures of the same subject or of the same group of subjects so that the illumination of the subject or subjects is the same and the camera need not be adjusted between the making of successive exposures of a group. Consequently, the exposures exhibit the same average density in the individual colors, even if the camera is not equipped with an automatic exposure control system. If the switching point to a higher brightness coincides with the switching point for switching back to a lower brightness, it can happen (in this range) that a central point of the density values of a series of exposures coincides with the region of the switching point. Consequently, it is possible that the copying of each and every negative necessitates a fresh switching operation. By altering the comparison values for the one and for the other switching operation, one can provide a certain intermediate range in which no switching over takes place. As a result of the selection of such intermediate range, not all of the originals which could be copied with the greater light flow are copied under such circumstances; however, one saves several switching operations. It can be readily ascertained for each of the aforementioned groups of negatives that, by shifting of the two comparison values with reference to each other, one can obtain the maximum copying output by minimizing the number of switching operations and by shortening the intervals of exposure. By first approximation, this should be the case when the comparison values are shifted by 10–20 percent. In the diagram of FIG. 3, and assuming that the device 26 is on, the curve 30 denotes when the device 26 becomes effective as the light transmissivity of the negatives increases when the shortest of the three anticipated exposure times is less than 50 ms. When the densities rise on the working curve 29, no switching over takes place when all anticipated exposure times exceed 100 ms. Such switching over takes place only when all of the anticipated exposure times exceed 120 ms. This means that the corresponding shortest exposure times, in the case of full light current, are still above 60 ms. The two different density conditions under which a switching over takes place are denoted in FIG. 3 by the horizontal lines 31, 32 and are identified by arrows.

The aforediscussed criteria for a switching over of the light weakening device 26 are also valid and applicable when the original which is to be copied is not examined at the copying station but rather at a station which precedes the copying station. In order to perform a copying operation, one must store a pulse for actuation of the device 26 while the preceding exposure is in progress and thereafter until after completion of advancement of the photographic paper 14 and replacement of the original 9 with a fresh original. This interval of time is sufficient to effect a switching over of the device 26, if necessary. Therefore, under such circumstances, there is no need to shift from 50 to 60 ms and from 100 to 120 ms because such shifting brings no advantages insofar as the shortening of intervals between successive copying operations is concerned. This will be readily appreciated since the intervals for advancement of carrier 14 and replacement of originals 9 suffice to turn the device 26 on or off without losing any additional time.

An important advantage of the improved control system and the associated light intensity regulating means is that the light weakening device 26 is adjustable in stepwise fashion, e.g., in two stages (on and off) as shown in the drawing. This renders it possible to classify the originals into two large categories, namely, a first category whose constituents would necessitate exposure times which are too short if exposed to copying light of maximum intensity (device 26 off), and a second category whose constituents can be reproduced by resorting to exposure times which are longer than the shortest acceptable or permissible exposure times. All that is necessary is to carry out certain adjustments or modifications of the photoelectric monitoring means (which is required anyway) for the originals at the copying station. Such adjustments allow for appropriate classification of originals into two categories prior to start of the exposure, i.e., without resorting to any additional measuring or monitoring means. By evaluating and comparing the density of an original in each of the three colors (red, blue, green) one can readily ascertain, for each and every reproduction of a color negative, whether or not the minimum acceptable exposure time is reached to thus invariably avoid the making of unsatisfactory color prints on the ground that the exposure time was too short.

It is within the purview of the invention to simply remove the device 26 from the light path between the source 1 and the plane of the original 9 when the anticipated exposure time in the green, red and blue colors are longer than 120 milliseconds, i.e., when it is necessary to adjust the device 26 so as to allow a greater quantity of copying light to reach the original in order to reduce the interval of exposure.

It is further possible to effect a three-stage adjustment of the device 26, e.g., by resorting to a grey filter which is inserted into the path of copying light to effect an intermediate light intensity weakening effect while the device 26 intercepts a minimal amount of copying light. This would necessitate certain modifications of the adjusting means in the exposure control circuit 11 so as to place the grey filter into the path of copying light when the intervals denoted by first signals furnished by the detectors 10, 24, 25 are within a given range.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a machine for making photographic copies of color originals on photosensitive copying material, wherein the original is supported in a predetermined plane extending across the path of light from a light source to the copying material, wherein the duration of exposure of the copying material to copying light in several colors is selected by an automatic exposure control system, wherein a light intensity weakening device controls the intensity of light traveling in said path, and wherein an adjusting device adjusts the light intensity weakening device in dependency on the density of the original, the combination of normally closed shutter means interposed between said plane and the copying material; means for opening said shutter means for the duration of exposure as determined by the automatic exposure control system; and means for delaying the operation of said opening means for a predetermined interval of time whenever the weakening device is being adjusted by the adjusting means.

2. The combination of claim 1, wherein the adjustment of said weakening means consumes a predetermined first period of time and said delaying means is operative to delay the opening of said shutter means for a second period of time which is a fraction of said first period.

3. The combination of claim 2, wherein said second period of time is at least 50 percent of said first period.

4. The combination of claim 3 wherein said adjusting means includes means for actuating said delaying means.

5. The combination of claim 1 for use in a machine in which control signals generated by the exposure control system and denoting the desired intervals of exposure of the copying material in each of three different colors are compared with first and second reference signals respectively denoting the longest and shortest acceptable intervals of exposure to light in any of said colors, and in which the light intensity weakening device is permanently located in said path and is adjusted by the adjusting means into a first position of high transmissivily when the value of at least one of the control signals transcends that of the first reference signal and into a second position of low transmissivity when the value of at least one of the control signals transcends that of the second reference signal; wherein the value of the first reference signal exceeds that of the product of multiplication of the second reference signal by a constant denoting the light intensity weakening effect of the weakening device in its second position relative to its first position.

6. The combination of claim 5, wherein the value of the first reference signal exceeds that of the product of multiplication of the second reference signal by said constant by approximately 20 percent.

* * * * *